(12) United States Patent
Defoort et al.

(10) Patent No.: US 9,172,427 B2
(45) Date of Patent: Oct. 27, 2015

(54) CROSSTALK CANCELLATION DEVICE AND METHOD WITH IMPROVED VECTORING STABILISATION

(75) Inventors: Frank Defoort, Kruibeke-Bazel (BE); Jan Verlinden, Wommelgem (BE); Dirk Vanderhaegen, Wemmel (BE); Danny Van Bruyssel, Bonheiden (BE); Carl Nuzman, Union, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 109 days.

(21) Appl. No.: 13/990,615

(22) PCT Filed: Dec. 7, 2011

(86) PCT No.: PCT/EP2011/072102
§ 371 (c)(1),
(2), (4) Date: Jul. 29, 2013

(87) PCT Pub. No.: WO2012/080064
PCT Pub. Date: Jun. 21, 2012

(65) Prior Publication Data
US 2013/0301824 A1    Nov. 14, 2013

(30) Foreign Application Priority Data
Dec. 17, 2010   (EP) .................................... 10290665

(51) Int. Cl.
*H04B 3/32*    (2006.01)
*H04M 3/34*    (2006.01)
*H04B 1/12*    (2006.01)
*H04J 3/10*    (2006.01)

(52) U.S. Cl.
CPC ........ *H04B 3/32* (2013.01); *H04B 1/123* (2013.01); *H04J 3/10* (2013.01); *H04M 3/34* (2013.01)

(58) Field of Classification Search
None
See application file for complete search history.

(56) References Cited

U.S. PATENT DOCUMENTS

| 2009/0046568 | A1* | 2/2009 | Xu ................................. 370/201 |
| 2009/0270038 | A1  | 10/2009 | Clausen |
| 2011/0110409 | A1* | 5/2011 | Sands et al. .................... 375/222 |
| 2011/0206101 | A1* | 8/2011 | Matza et al. ................... 375/222 |
| 2012/0106605 | A1* | 5/2012 | Ashikhmin et al. ........... 375/222 |

OTHER PUBLICATIONS

International Search Report PCT/ISA/210 for PCT/EP2011/072102 dated Feb. 29, 2012.

* cited by examiner

*Primary Examiner* — Fan Tsang
*Assistant Examiner* — Jeffrey Lytle
(74) *Attorney, Agent, or Firm* — Harness, Dickey and Pierce, P.L.C.

(57) ABSTRACT

A crosstalk cancellation device cancels crosstalk noise of at most M disturbing communication lines in a victim communication line forming part of a vectoring group. The crosstalk cancellation device gradually decreases the cancellation depth of a cancelled disturbing communication line in the victim communication line upon a crosstalk noise variation in the vectoring group requiring cancellation of crosstalk noise of a not yet cancelled disturbing communication line in the victim communication line.

11 Claims, 4 Drawing Sheets

CROSSTALK CANCELLATION DEVICE AND METHOD WITH IMPROVED VECTORING STABILISATION

This application is the national phase under 35 U.S.C. §371 of PCT International Application No. PCT/EP2011/072102 which has an International filing date of Dec. 7, 2011, which claims priority to European patent application number 10290665.8 filed Dec. 17, 2010; the entire contents of each of which are hereby incorporated by reference.

FIELD OF THE INVENTION

The present invention generally relates to crosstalk cancellation between communication lines, e.g. crosstalk between Digital Subscriber Line (DSL) twisted pairs within the same cable binder or bundle that interfere with each other resulting in unwanted leakage of the DSL signals sent over certain twisted pairs, i.e. the disturbing communication lines, into another used twisted pair, i.e. the victim communication line. Such crosstalk represents noise in the victim communication line that reduces the Signal-to-Noise Ratio (SNR) and consequently also the bit rate of the victim communication line. A sudden increase of such crosstalk, for instance resulting from an upcoming line or changing environmental conditions, may cause instabilities when the victim communication line cannot adapt sufficiently quickly, e.g. through seamless rate adaptation (SRA) or bitswap operations. The present invention in particular concerns a crosstalk cancellation technique that resolves this instability problem in case of sudden crosstalk channel variations.

BACKGROUND OF THE INVENTION

ITU-T Recommendation G.993.5 entitled "Self-FEXT Cancellation (Vectoring) for Use with VDSL2 Transceivers" describes vectoring which is a crosstalk cancellation mechanism for DSL lines. Crosstalk induced by disturbing DSL lines into a victim DSL line is cancelled by adding an anti-signal to the victim DSL line that compensates for the crosstalk noise from the disturbing DSL lines. Vectoring can be done for plural disturbing DSL lines enabling to suppress simultaneously the crosstalk from all these disturbing DSL lines within the victim DSL line. In the downstream direction, i.e. the direction from the central office (CO) to the customer premises equipment (CPE), crosstalk cancelling is done by a pre-coder that pre-compensates for crosstalk by adding the anti-signal of the crosstalk to the wanted DSL signal that will be transmitted over the victim DSL line. In the upstream direction, i.e. the direction from CPE to CO, crosstalk cancellation is executed by a post-coder that post-compensates for crosstalk by adding the anti-signal of the crosstalk to the DSL signal received from the victim DSL line.

Crosstalk cancellation relies on grouping all communication lines that interact with each other, e.g. the lines within the same binder or cable bundle, in a so called vectoring group. In such vectoring group, each communication line is considered as a disturbing communication line inducing crosstalk in all other lines (and named "disturber" throughout the remainder of this patent application), and each communication line is considered as a victim communication line receiving crosstalk from all other lines (and named "victim" throughout the remainder of this patent application). The induced crosstalk from one disturber into one victim is separated in two parts: a transfer function or so called "crosstalk channel", i.e. a function between the two lines describing the crosstalk coupling, and the transmit Power Spectral Density (PSD) of the signal transmitted on the disturber. There is a particular crosstalk channel for any combination of a disturber and a victim. The induced crosstalk is calculated as the multiplication of the particular crosstalk channel and the transmit PSD of the disturber. The crosstalk channel between a disturber and a victim is measured for instance during initialisation and represented by a crosstalk channel coefficient in a crosstalk channel matrix wherein rows represent victims and columns represent disturbers, or vice versa. To measure for instance the crosstalk channel coefficient between two VDSL lines, a pilot signal is superimposed onto the SYNC symbols during initialisation of the disturbing VDSL line, and correlation techniques are applied to recognize the crosstalk noise induced by this pilot signal into the victim VDSL line. The crosstalk channel coefficient is then calculated from the known pilot signal and the sensed noise. If the victims represent rows and the disturbers represent columns in the crosstalk channel matrix, each row in the crosstalk channel matrix constitutes a vector representing the entire crosstalk induced by all disturbers in the vectoring group into a single victim. Theoretically, such vector enables to cancel the crosstalk of all disturbers into the victim simultaneously through addition of a single anti-signal that represents the inverse of the aggregate crosstalk.

Unfortunately, technologic restrictions prevent creating a vectoring system that can cancel the crosstalk of all lines in a large vectoring group. In order to cancel the crosstalk within a vectoring group of for instance 400 VDSL lines, in the order of $10^{13}$ Multiply and Accumulate (MAC) operations per second must be executed. This is at present technologically not feasible in a cost and power efficient way. As a consequence, partial crosstalk cancellation is implemented today, enabling to cancel crosstalk of a limited number of disturbers out of a vectoring group within a victim, e.g. at most M=16 disturbers. These 16 disturbers may be arbitrarily selected within the vectoring group but for obvious reasons preferably represent the most dominant disturbers for the victim under consideration. Typically, an algorithm will be implemented to determine the M most dominant disturbers for each victim such that the crosstalk induced by these M disturbers can be cancelled while crosstalk coming from other disturbers in the vectoring group remains un-cancelled thereby minimizing the total residual noise on the victim and therefore optimizing the bit rate achievable on the victim. This algorithm may create a single list of dominant disturbers based on the full spectrum or it may create multiple lists for arbitrary parts of the spectrum.

In case of a crosstalk noise variation at a point in time where crosstalk of the maximum number M of disturbers is already cancelled, this crosstalk noise variation may impact the stability of the victims. The crosstalk noise variation may result from an additional line starting up or an increasing disturbance from a line in the vectoring group as a result of a crosstalk channel change or an increased signal PSD transmitted by the disturber. A crosstalk channel change may for instance be caused by environmental changes such as temperature variations, wire tension changes, rain or moisture leakage, etc., as a result of which the disturber and victim lines become more strongly coupled. As a result of a crosstalk noise variation, a non-cancelled line of the vectoring group may become a more dominant disturber that needs to be cancelled. The straightforward approach in case of partial crosstalk cancellation will estimate if the new crosstalk noise resulting from the newly start-up line or the varying crosstalk channel or increased PSD transmit signal of a particular disturber is above the crosstalk noise level of the least dominant disturber out of the M cancelled disturbers for a particular victim. In case the new crosstalk noise is below the crosstalk noise level of the least dominant cancelled disturber for a particular victim, the new line will be started without cancelling its crosstalk noise into the particular victim or the particular disturber with changed crosstalk noise will remain un-cancelled for the particular victim. Unfortunately, startup of the new line or leaving the disturber with varying crosstalk channel or varying transmit PSD un-cancelled, will create a sudden crosstalk noise boost, i.e. a noise residue in any victim that can affect the stability of these victims. In case the new crosstalk noise is above the crosstalk noise level of the least dominant cancelled disturber, this least dominant disturber will no longer be cancelled. It will be removed from the list of M cancelled disturbers, and will be replaced by the new or increased disturber. Anyhow, also this situation will cause a sudden boost in crosstalk noise resulting from the least dominant disturber that is no longer cancelled. This sudden crosstalk noise boost may also cause instabilities on victim lines.

In summary, whereas full crosstalk cancellation based on vectoring is technologically not feasible for large vectoring groups, partial crosstalk cancellation suffers from instability problems in case of crosstalk noise variation.

It is an objective of the present invention to disclose a device and method for crosstalk cancellation in a vectoring group that overcomes the above mentioned drawback, enabling victim lines to cope with crosstalk noise variation without risking instabilities.

SUMMARY OF THE INVENTION

According to the present invention, the above defined objective is realized by a crosstalk cancellation device for cancelling crosstalk noise of at most M disturbing communication lines in a victim communication line as defined by claim 1, the disturbing communication lines and the victim communication line forming part of a vectoring group, and M being a positive integer number, the crosstalk cancellation device being adapted to gradually decrease the cancellation depth of a cancelled disturbing communication line in the victim communication line upon a crosstalk noise variation in the vectoring group requiring crosstalk noise of a not yet cancelled disturbing communication line in the victim communication line to be cancelled.

Thus, instead of just removing the least dominant disturber from the list of M cancelled disturbers, the crosstalk canceller operating according to the principles of the current invention will gradually decrease the cancellation depth in the particular victim under consideration, i.e. the degree of crosstalk cancellation, thereby increasing the crosstalk noise residue from the line(s) that will no longer be cancelled in the particular victim. This way, a sudden crosstalk noise boost which may cause instabilities in the victim line, is avoided. As a result of the present invention, the victim line shall have the possibility to seamlessly adapt to the increased crosstalk level via mechanisms such as bitswap or Seamless Rate Adaptation (SRA) as defined for instance in the ITU-T VDSL Recommendation G.993.2. Those techniques are rather slow, typically capable of handling the full DSL spectrum in terms of fractions of seconds up to tens of seconds. While the bitswap operation can move bits around over the DSL spectrum, the SRA operation can convert bitrate into signal-to-noise ratio (SNR) margin and vice versa. The combination of bitswap and SRA allows a DSL system to adapt without errors to slowly increasing noise conditions. Such a condition is created via the present invention when allowing the crosstalk noise of a DSL line that no longer will be cancelled in a particular victim to gradually increase over a time interval of for instance 1 minute. However, bitswap and SRA are not suited to adapt to a sudden crosstalk noise boost which would occur if the present invention is not used. It is noticed that in absence of the present invention, such crosstalk noise boost may be present in the entire frequency spectrum or only part of it.

Further, the present invention ensures that the most dominant disturbers are cancelled, also after a crosstalk noise variation resulting from a newly upcoming line, a changed crosstalk channel as a result of for instance changed weather conditions, or a changed disturber transmit PSD, thereby optimizing the bit rate achievable on the victim line through partial crosstalk cancellation.

In addition to a crosstalk cancellation device as defined by claim 1, the present invention also concerns a corresponding crosstalk cancellation method for cancelling crosstalk noise of at most M disturbing communication lines in a victim communication line, as defined by claim 1, the disturbing communication lines and the victim communication line forming part of a vectoring group, and M being a positive integer number, the crosstalk cancellation method comprising gradually decreasing the cancellation depth of a cancelled disturbing communication line in the victim communication line upon a crosstalk noise variation in the vectoring group requiring crosstalk noise of a not yet cancelled disturbing communication line in the victim communication line to be cancelled.

Optionally, as defined by claim 2, the crosstalk cancellation device according to the present invention is adapted to reserve K spare positions in a list of at most M disturbing communication lines, K being an integer number equal to or higher than one.

Indeed, in order to enable for the victim line, that the crosstalk can be cancelled of for instance K=3 new disturbers starting up simultaneously without delaying their start-up, the crosstalk canceller must at any time keep 3 spare positions in the list of M disturbers that it can cancel. At the start-up time of 3 new disturbers, the crosstalk canceller may then temporarily cancel the crosstalk of up to M disturbing lines. Afterwards, if there are less than 3 spare positions, some of the least dominant disturbers are seamlessly phased-out in order to re-generate the 3 spare positions over a time interval of for instance 1 minute. Obviously, the number 3 is only given as an example. Generally, any number of K spare positions, K being an integer between zero and M (including M), is feasible. In case the parameter K is set zero, the operation of the crosstalk cancellation device will reduce to that of a crosstalk cancellation device without parameter K. In such embodiment of the invention or in any situation where the number of disturbers starting up simultaneously is larger than K, the start-up of one or more new disturber(s) shall be delayed until the least dominant cancelled disturber(s) is/are seamlessly phased-out in each victim line. In case the parameter K is set equal to M, the impact of each new starting-up line will be softened and the notion of a vectoring group may vanish when applying the current invention.

Further optionally, as defined by claim 3, the number K may be configurable.

Indeed, the number K may be pre-configured by the manufacturer or may be operator configurable. The number may be higher in vectoring groups where there is a higher risk for simultaneously joining lines, e.g. in the presence of a bonding CPE where multiple lines start-up simultaneously when the CPE is switched on. The number of spare positions may also be tuned dynamically, e.g. to anticipate on situations where a large number of lines will join simultaneously and avoid long start-up delays.

According to a further aspect of the current invention, defined by claim 4, in case crosstalk of J not yet cancelled disturbing communication lines has to be cancelled in the victim line as a result of a crosstalk noise variation, J representing a positive integer number smaller than or equal to M−K−A, with A representing a number of disturbing communication lines whose crosstalk is actually cancelled in the victim line, the crosstalk cancellation device according to the present invention may be adapted to add the J not yet cancelled disturbing communication lines to the list.

Thus, in situations where the amount A of actually cancelled disturbers is low and there is sufficient space in the list of at most M disturbers to allow J newly upcoming lines without affecting the K spare positions, the J newly upcoming lines will be added to the list and the crosstalk canceller according to the present invention will cancel the crosstalk induced by these J new disturbers in the victim. Start-up of the J joining lines does not need to be delayed.

According to a further aspect of the current invention, defined by claim 5, in case crosstalk of J not yet cancelled disturbing communication lines has to be cancelled in the victim line as a result of a crosstalk noise variation, J representing a positive integer number smaller than or equal to M−A and higher than M−K−A, with A representing a number of disturbing communication lines whose crosstalk is actually cancelled in the victim line, the crosstalk cancellation device according to the invention may be adapted to add the J not yet cancelled disturbing communication lines to the list, to increase A with J, and to gradually decrease the cancellation depth of A−M+K least disturbing communication lines out of the list in the victim communication line.

Thus, in a situation where the number J of simultaneously upcoming lines stays below the number of free locations in the list, i.e. J<=M−A, but some or all of the K spare positions are needed to allow the J joining lines, i.e. J>M−K−A, the J newly upcoming lines will be added to the list and the crosstalk canceller according to the present invention will cancel the crosstalk noise induced by these J new disturbers in the victim line without delaying the start-up of any one of the J lines. The parameter A, representing the amount of actually cancelled disturbers in the particular victim, will be increased by J. Thereafter, the crosstalk canceller will free-up the K spare positions by gradually reducing the crosstalk cancellation depth of A−M+K least disturbing lines, e.g. over a time interval of 1 minute. These A−M+K least disturbing lines may include one or more of the J newly joined lines.

According to a further aspect of the current invention, defined by claim 6, in case crosstalk of J not yet cancelled disturbing communication lines has to be cancelled in the victim line as a result of a crosstalk noise variation, J representing a positive integer number higher than M−A, with A representing a number of disturbing communication lines whose crosstalk is actually cancelled in the victim line, the crosstalk cancellation device is adapted to add M−A out of the J not yet cancelled disturbing communication lines to the list, to gradually reduce cancellation depth of K least disturbing communication lines out of the list in the victim communication line, to add another K out of the J not yet cancelled disturbing communication lines to the list, and to repeat the last two steps until the J not yet cancelled disturbing communication lines have been added to the list.

Thus, if the amount J of new upcoming lines exceeds the available positions within the list, i.e. J>M−A, then M−A newly upcoming lines will be added to the list and the crosstalk canceller according to the present invention will cancel the crosstalk noise induced by these M−A new disturbers in the victim without delaying start-up of these M−A lines. Thereafter, the crosstalk canceller according to the invention will seamlessly phase out the K least disturbing cancelled lines to free-up K spare positions in the list. Once this is done, the crosstalk canceller will allow K additional lines out of the J newly upcoming lines to join the list and start-up. The crosstalk canceller will again cancel the crosstalk induced by the K additional lines. Once in showtime the crosstalk canceller will repeatedly phase-out the K least disturbing lines and allow another set of K lines to join. This will be repeated until all J lines have joined. In the last iteration, possibly less than K lines may join.

Alternatively, as defined by claim 7, in case crosstalk of J not yet cancelled disturbing communication lines has to be cancelled in the victim line as a result of a crosstalk noise variation, J representing a positive integer number higher than M−A, with A representing a number of disturbing communication lines whose crosstalk is actually cancelled in the victim line, the crosstalk cancellation device according to the invention may be adapted to add M−A out of the J not yet cancelled disturbing communication lines to the list, to increase K, to iteratively gradually reduce the cancellation depth of K least disturbing communication lines out of the list in said victim communication line and to add K not yet cancelled disturbing lines to the list until the J not yet cancelled disturbing communication lines have been added to the list, and to re-set K.

Thus, instead of iteratively allowing K lines to join and seamless phase-out of K lines to create spare positions for the next iteration, an embodiment of the crosstalk canceller according to the invention with dynamically adjustable parameter K, may temporarily increase the parameter K to equal J−M+A. This way, sufficient spare positions will be created in the list to enable all upcoming lines to join in the second iteration, i.e. without further delay. Alternatively, when J is for instance larger than M or when all lines of a vectoring group are simultaneously starting up after a crash, K may be temporarily increased to reduce the amount of iterations needed to adjust the list of most dominant disturbers. This way, the average delay for starting up lines will be minimized.

Optionally, as defined by claim 8, the crosstalk cancellation device according to the present invention may be adapted to gradually reduce the cancellation depth of a disturbing communication line through gradually lowering crosstalk channel coefficients of the disturbing communication line for all Discrete Multi-Tone (DMT) tones in a pre-coder and/or post-coder towards zero.

Indeed, one way to gradually phase-out a disturber in the amplitude dimension consists in decreasing the crosstalk channel coefficients used by the pre-coder (for the downstream direction) and/or the post-coder (for the upstream direction) stepwise towards zero. In a multi-tone system such as a DMT based DSL line, the crosstalk coefficients of all tones may be decreased simultaneously.

It is noticed that the seamless phase-out may be implemented in software, e.g. in the Vector Control Entity (VCE), or alternatively can be implemented in the pre-coder and post-coder hardware.

Alternatively, as defined by claim 9, the crosstalk cancellation device according to the present invention may be adapted to gradually reduce the cancellation depth of a disturbing communication line through clearing crosstalk channel coefficients of the disturbing communication line in a pre-coder and/or post-coder gradually per DMT tone or per DMT tone group.

Thus, in case of a multi-tone system, seamless phase-out of a disturber may also be achieved in the frequency dimension by setting the crosstalk channel coefficients of the different DMT tones used in the pre-coder and/or post-coder equal to zero one after the other. Possibly, the DMT tones may be combined in subsets and the crosstalk channel coefficients will be set to zero subset by subset.

According to yet another alternative, defined by claim 10, the crosstalk cancellation device according to the invention may be adapted to increase crosstalk noise of a disturbing communication line through injecting virtual noise in the victim communication line, the virtual noise level being derived directly from the used crosstalk channel coefficients in the pre-coder and/or post-coder, and afterwards clearing all crosstalk channel coefficients of the disturbing communication line in the pre-coder and/or post-coder.

Indeed, by injecting virtual noise in the victim communication line, the latter shall adapt its bit rate to a situation with higher assumed noise, using traditional mechanisms such as bitswap or SRA. The advantage of using virtual noise is that it can be applied at once without causing instabilities on the victim communication line, as the noise is virtual. Once the victim line has adapted to a level of virtual noise that corresponds with the crosstalk noise induced by the disturber selected for phase-out, the crosstalk channel coefficients of the latter used by the pre-coder and/or post-coder may be set to zero all at once. If this virtual noise procedure is fast enough, it is an alternative to work with K equal to zero and to always delay the start-up of lines until all other lines have their virtual noise taken into account.

DETAILED DESCRIPTION OF EMBODIMENT(S)

Figure 1:
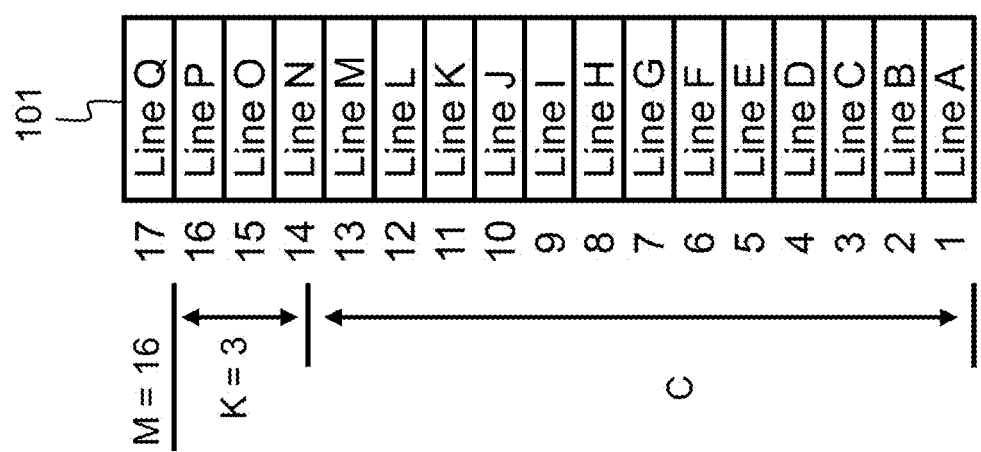
FIG. 1 shows the list 101 of cancelled disturbers in an embodiment of the crosstalk canceller according to the present invention for cancellation of crosstalk in a victim line V.

FIG. 1 shows the ordered list 101 of disturbers for victim line V in a crosstalk canceller according to the invention based on vectoring. In this list, the most dominant disturbers are listed at the bottom, the least dominant disturbers are listed at the top. Thus, line A is the most dominant disturber for victim line V. In decreasing disturbing order, line V is victim of crosstalk noise induced by Line A, Line B, Line C, Line D, Line E, Line F, Line G, Line H, Line I, Line J, Line K, Line L, Line M, Line N, Line O, Line P and line Q. The vectoring group where line V forms part of contains N lines, e.g. N=100. Any of these lines is considered as a victim line for all other lines, and any line is considered as a disturber inducing crosstalk noise into all other lines. The maximum number of disturbers that can be cancelled per victim line is M. In the embodiment illustrated by FIG. 1, M=16 for victim V. FIG. 1 further shows the number K of spare positions in the dominant disturber list for all victims, where K is supposed to be 3. Consequently, the number of disturbers whose crosstalk effectively will be cancelled in victim V is C=M−K=15−3=12.

Figure 2:
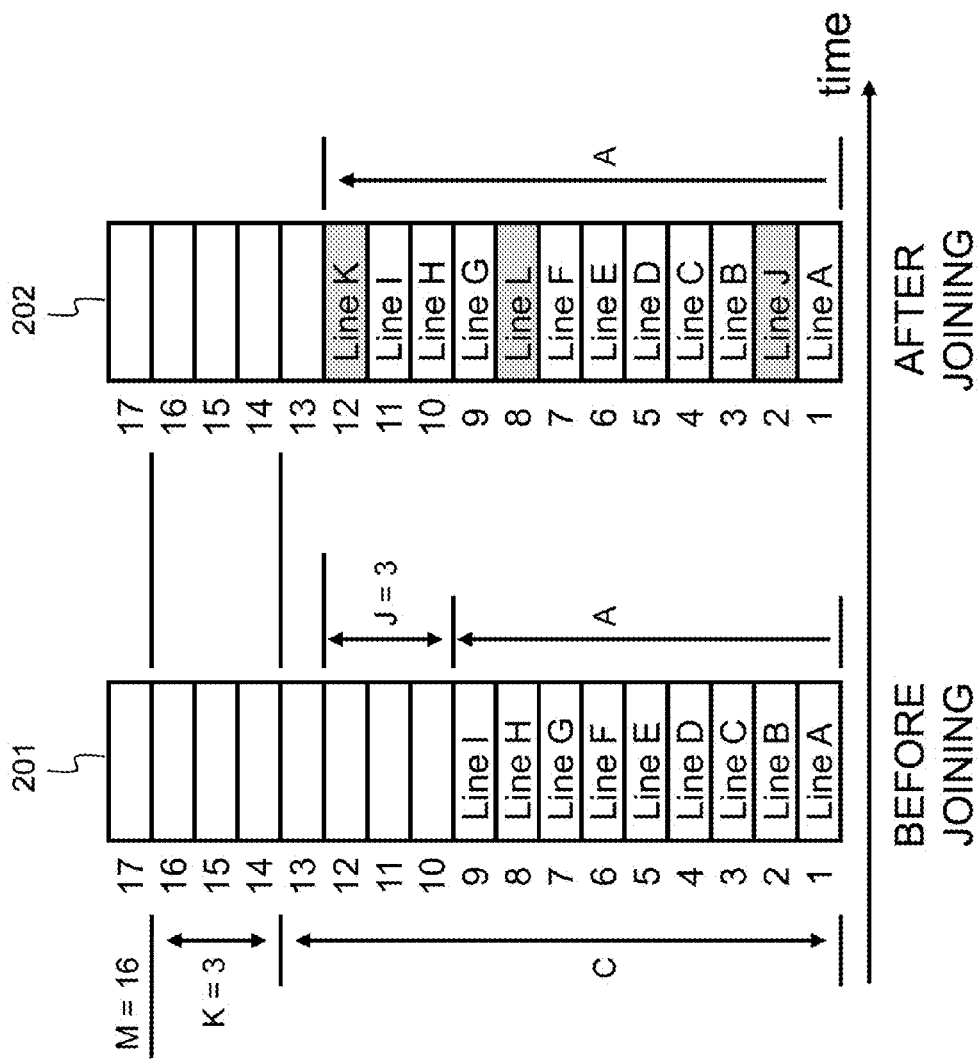
FIG. 2 illustrates evolution of the list of cancelled disturbers for victim line V known from FIG. 1 in a first situation where J new disturbers are joining in parallel.
Figure 3:
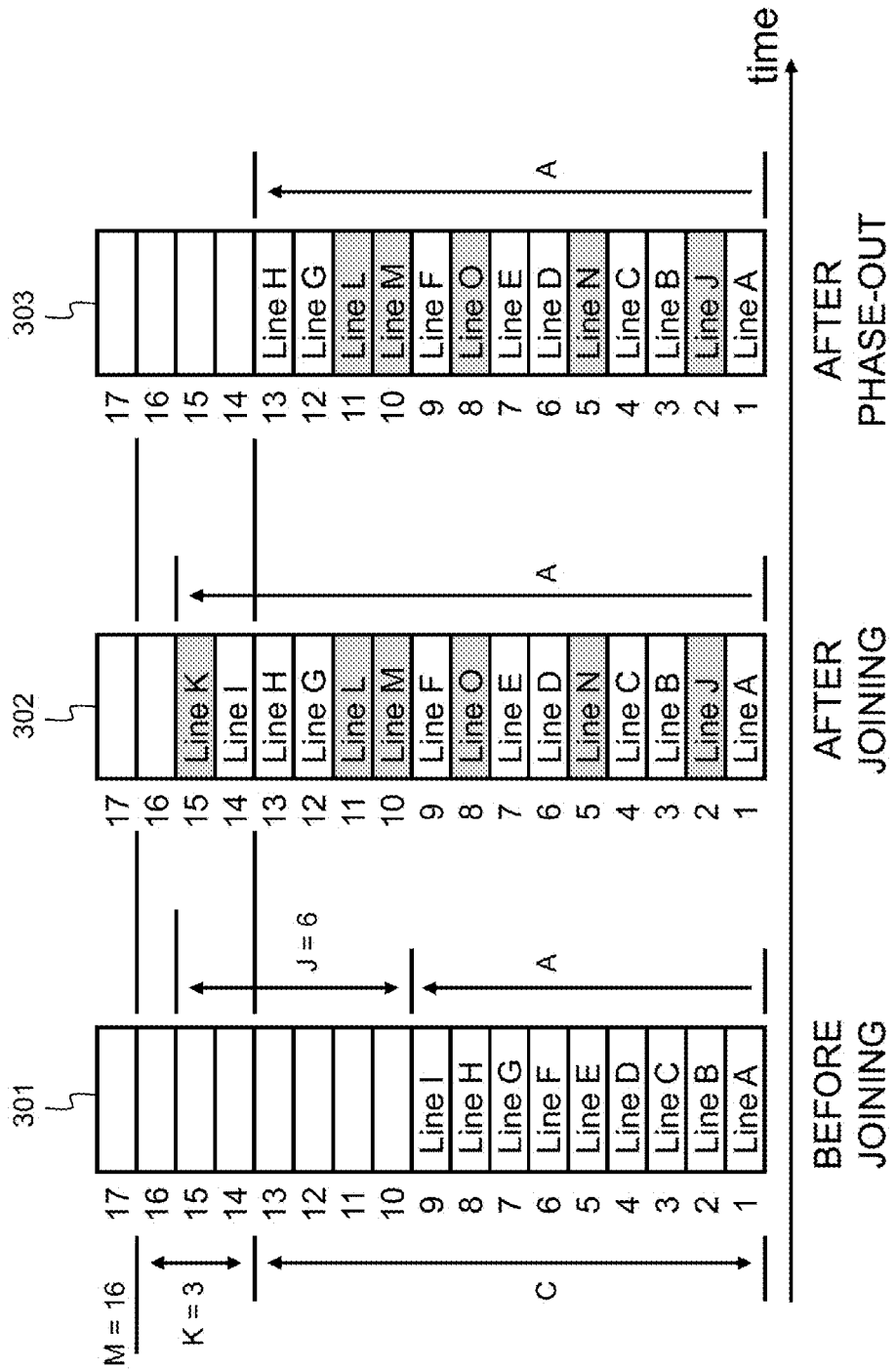
FIG. 3 illustrates evolution of the list of cancelled disturbers for victim line V known from FIG. 1 in a second situation where J new disturbers are joining in parallel.
Figure 4:
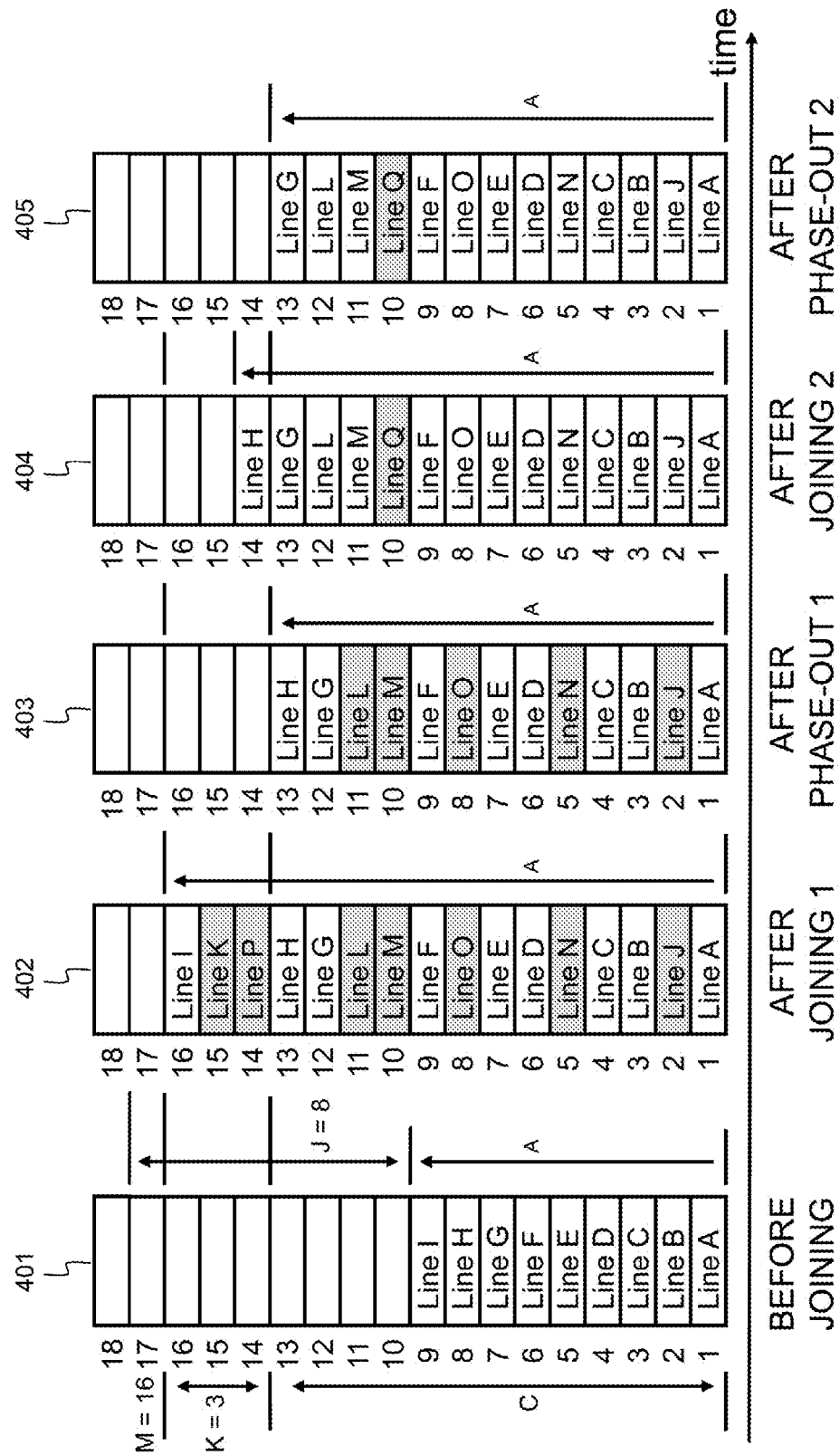
FIG. 4 illustrates evolution of the list of cancelled disturbers for victim line V known from FIG. 1 in a third situation where J new disturbers are joining in parallel.

FIG. 2, FIG. 3 and FIG. 4 illustrate the evolution in time of the list of disturbers for victim V in different situations wherein J new disturbers within the vectoring group want to start-up simultaneously. Depending on the actual number A of lines which are cancelled for victim V at the point in time where the J new lines want to start-up, a different approach is taken by the crosstalk canceller according to the invention.

FIG. 2 illustrates the situation where J<=M−K−A. In FIG. 2, J=3 represents three new lines, i.e. line J, line K and line L, that want to start-up at a point in time, "BEFORE JOINING", where the actual number of lines which are cancelled at that point in time is A=9. The nine lines that are actually cancelled at the point in time "BEFORE JOINING" in victim V are in decreasing order of disturbance: Line A, Line B, Line C, Line D, Line E, Line F, Line G, Line H and Line I. The list of cancelled disturbers for victim line V before joining hence is illustrated by 201 in FIG. 2. Since the three joining lines can all be cancelled, they are added to the list of dominant disturbers, and the list is re-ordered in decreasing disturbing order. Start-up of the three joining lines need not be delayed for victim V since the crosstalk induced by these three lines into victim V can be cancelled. The list of cancelled disturbers in victim V at a point in time "AFTER JOINING" is represented by 202 in FIG. 2. The newly joined lines are shaded in this list. The number of actually cancelled disturbers A is increased from 9 to 12. Since the list 202 still has more than K=3 spare positions, there is no need in this situation for seamless phase-out of any of the disturbers.

FIG. 3 illustrates the situation where J>M−K−A and J<=M−A at the point in time "BEFORE JOINING". In FIG. 3, J=6 lines are wanting to join simultaneously at the point in time "BEFORE JOINING". These lines are referenced by Line J, Line K, Line L, Line M, Line N and Line O in FIG. 3. The initial situation of the list before joining, represented by 301 in FIG. 3, is supposed to be equal to the initial situation in FIG. 2, i.e. 9 lines are actually cancelled in victim V: Line A, Line B, Line C, Line D, Line, Line F, Line G, Line H and Line I in decreasing disturbing order. Since the six joining lines can all be cancelled, they are added to the list of dominant disturbers, and the list is re-ordered in decreasing disturbing order. Start-up of the six joining lines need not be delayed for victim V since the crosstalk noise induced by these six lines into victim V can be cancelled: A+J<=M. The list of cancelled disturbers in victim V at a point in time "AFTER JOINING" is represented by 302 in FIG. 3. Herein, the newly joined lines are shaded. The number A of cancelled disturbers in victim line V is automatically increased from 9 to 15. Once the newly joined lines are in showtime, a seamless phase-out of A−(M−K)=A−M+K=15−16+3=2 lines is done to bring the number of spare positions in the list back to K=3. Thereto, the least dominant cancelled disturbers, i.e. Line K and Line I, are selected and the cancellation depth of these two disturbers in victim V is gradually decreased over a time interval of for instance 1 minute, up to the point in time "AFTER PHASE-OUT" where crosstalk of these two disturbers is no longer cancelled in victim V. The number A of cancelled disturbers in victim V is adjusted to 13, as is indicated by list 303.

FIG. 4 illustrates the situation where J>M−A. In FIG. 4, the number J of lines that want to join simultaneously is supposed to be 8 at a point in time "BEFORE JOINING" where the list 401 of actually cancelled disturbers in victim V contains 9 lines: Line A, Line B, Line C, Line D, Line E, Line F, Line G, Line H and Line I in decreasing disturbing order. The eight lines that want to join simultaneously are referenced by Line J, Line K, Line L, Line M, Line N, Line O, Line P and Line Q. Since J>M−A, not all new joining lines can be cancelled. Therefore, in a first step illustrated by list 402, M−A=16−9=7 lines will be cancelled. These 7 lines are randomly selected out of the 8 lines that want to join. Line J, Line K, Line L, Line M, Line N, Line O and Line P are added to the list of dominant disturbers, and the list is re-ordered in decreasing disturbing order. Start-up of the seven joining lines thus need not be delayed for victim V since the crosstalk induced by these seven lines in victim V can be cancelled immediately using all spare positions in the list. The list of cancelled disturbers in victim V at a point in time "AFTER JOINING 1" is represented by 402 in FIG. 4. Herein, the seven newly joined lines are shaded. At that point in time, Line Q is still waiting to join. The number A of cancelled disturbers in victim line V has increased up to the maximum amount of 16. Once the seven lines are in showtime, a seamless phase-out of K=3 lines will be done to bring the number of spare positions in the list back to K=3. Thereto, the least dominant cancelled disturbers, i.e. Line I, Line K and Line P, are selected and the cancellation depth of these three disturbers into victim V is gradually decreased over a time interval of for instance 1 minute, up to the point in time "AFTER PHASE-OUT 1" where crosstalk noise of these three disturbers is no longer cancelled in victim V. The number A of cancelled disturbers in victim V is adjusted to 13, as is indicated by list 403. In a following step, the crosstalk canceller will allow a next group of K lines that are waiting to join. In the case illustrated by FIG. 4, only Line Q is still waiting to join. Line Q is thus added to the list of dominant disturbers, and the list is re-ordered in decreasing disturbing order. The list of cancelled disturbers in victim V at a point in time "AFTER JOINING 2" where also Line Q has start-up, is represented by 404 in FIG. 4. The newly joined Line Q is shaded therein. The actual number A of cancelled disturbers in victim V is again increased up to 14. Once Line Q is in showtime, a seamless phase-out of one line will be done to bring the number of spare positions in the list back to K=3. Thereto, the least dominant cancelled disturber, i.e. Line H, is selected and the cancellation depth of this disturber in victim V is gradually decreased over a time interval of for instance 1 minute, up to the point in time "AFTER PHASE-OUT 2" where the crosstalk of this disturber is no longer cancelled in victim V. The number A of cancelled disturbers in victim V is again adjusted to 13, as is indicated by list 405. If a higher number of lines join simultaneously, the latter two steps are repeated, i.e. iteratively allowing a random selection of K lines to join and smoothly phasing-out the K least dominant cancelled disturbers, until all lines that want to join are in showtime. The last iteration obviously may be performed with less than K lines, as illustrated by 404 and 405 in FIG. 4.

Although it is mentioned here above that the lines that are allowed to join may be selected randomly amongst the candidate lines for joining, the selection of the lines that will join in the successive iterations may alternatively be determined on the basis of the vectoring. Typically, it is the Vector Control Entity (VCE) that shall decide which lines can join taking into consideration all victims.

It is noticed that the joining of new lines has been described here above from the point of view of a single victim line. Obviously, all victim lines in the vectoring group have to prepare for the joining of a new line before the new line is allowed to startup. As a result, the number J of lines that wants to join simultaneously will have to be compared with the maximum of the numbers A of actually cancelled disturbers over all victims in the vectoring group. This maximum number may be referenced by Max−A. To ease explanation of the current invention here above, all A values have been supposed equal as a result of which Max−A was set equal to A. This is also the most probable situation in reality.

It is further noticed that the above mechanism defined for the joining of a new line, can also be used during vectoring tracking, i.e. tuning in showtime to adapt to crosstalk noise variations resulting from a disturber increasing its transmit PSD or resulting from a change in the crosstalk channel. If, due to crosstalk noise variations, a not yet cancelled disturber becomes more disturbing than the least dominant cancelled disturber, then a swap of those lines can be done according to the principles of the current invention, i.e. by first cancelling the new line in victim lines and then doing a seamless phase-out of the least dominant cancelled disturber.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A crosstalk cancellation method for cancelling crosstalk noise of at most M disturbing communication lines in a victim communication line, said disturbing communication lines and said victim communication line forming part of a vectoring group, and M being a positive integer number, wherein said crosstalk cancellation method comprises:

gradually decreasing a degree of crosstalk cancellation of at least one cancelled disturbing communication line in said victim communication line in response to a crosstalk noise variation in said vectoring group requiring crosstalk noise of a not yet cancelled disturbing communication line in said victim communication line to be cancelled, wherein said gradually decreasing includes decreasing said degree of crosstalk cancellation of said at least one cancelled disturbing communication line in said victim communication line through one or more intermediary stages between a maximum crosstalk cancellation of said at least one cancelled disturbing communication line in said victim communication line and no crosstalk cancellation of said at least one cancelled disturbing communication line in said victim communication line.

2. The crosstalk cancellation method according to claim 1, further comprising:
reserving K spare positions in a list of the at most M disturbing communication lines, K being an integer number greater than or equal to one.

3. The crosstalk cancellation method according to claim 2, wherein said number K is configurable.

4. The crosstalk cancellation method according to claim 3, wherein if crosstalk of J not yet cancelled disturbing communication lines has to be cancelled in said victim communication line as a result of the crosstalk noise variation, J representing a positive integer number greater than M−A, with A representing a number of disturbing communication lines whose crosstalk is actually cancelled in said victim communication line, said method further includes
adding M−A out of said J not yet cancelled disturbing communication lines to said list of the at most M disturbing communication lines;
increasing K;
iteratively reducing the degree of crosstalk cancellation of K least disturbing communication lines out of said list of the at most M disturbing communication lines in said victim communication line and adding K not yet cancelled disturbing communication lines to said list of the at most M disturbing communication lines until said J not yet cancelled disturbing communication lines have been added to said list of the at most M disturbing communication lines; and
resetting K to an initial value.

5. The crosstalk cancellation method according to claim 2, wherein if crosstalk of J not yet cancelled disturbing communication lines has to be cancelled in said victim communication line as a result of the crosstalk noise variation, J representing a positive integer number less than or equal to M−K−A, with A representing a number of disturbing communication lines whose crosstalk is actually cancelled in said victim communication line, said method further includes
adding said J not yet cancelled disturbing communication lines to said list of the at most M disturbing communication lines.

6. The crosstalk cancellation method according to claim 2, wherein if crosstalk of J not yet cancelled disturbing communication lines has to be cancelled in said victim communication line as a result of the crosstalk noise variation, J representing a positive integer number less than or equal to M−A and greater than M−K−A, with A representing a number of disturbing communication lines whose crosstalk is actually cancelled in said victim communication line, said method further includes
increasing A by J by adding said J not yet cancelled disturbing communication lines to said list of the at most M disturbing communication lines; and
decreasing the degree of crosstalk cancellation of A−M+K least disturbing communication lines out of said list of the at most M disturbing communication lines in said victim communication line.

7. The crosstalk cancellation method according to claim 2, wherein if crosstalk of J not yet cancelled disturbing communication lines has to be cancelled in said victim communication line as a result of the crosstalk noise variation, J representing a positive integer number greater than M−A, with A representing a number of disturbing communication lines whose crosstalk is actually cancelled in said victim communication line, said method further includes
adding M−A out of said J not yet cancelled disturbing communication lines to said list of the at most M disturbing communication lines;
reducing the degree of crosstalk cancellation of K least disturbing communication lines out of said list of the at most M disturbing communication lines in said victim communication line;
adding another K out of said J not yet cancelled disturbing communication lines to said list of the at most M disturbing communication lines; and
repeating said reducing the degree of crosstalk cancellation of K least disturbing communication lines and said adding another K out of said J not yet cancelled disturbing communication lines to said list of the at most M disturbing communication lines until said J not yet cancelled disturbing communication lines have been added to said list of the at most M disturbing communication lines.

8. The crosstalk cancellation method according to claim 1, wherein said decreasing comprises:
decreasing the degree of crosstalk cancellation of said at least one cancelled disturbing communication line by lowering crosstalk channel coefficients of said at least one cancelled disturbing communication line for all Discrete Multi-Tone tones in at least one of a pre-coder and post-coder towards zero.

9. The crosstalk cancellation method according to claim 1, wherein said decreasing comprises:
decreasing the degree of crosstalk cancellation of said at least one cancelled disturbing communication line by clearing crosstalk channel coefficients of said at least one cancelled disturbing communication line in at least one of a pre-coder and post-coder per Discrete Multi-Tone tone or per Discrete Multi-Tone tone group.

10. The crosstalk cancellation method according to claim 1, wherein said decreasing comprises:
decreasing the degree of crosstalk cancellation of said at least one cancelled disturbing communication line by injecting virtual noise in said victim communication line, said virtual noise being derived directly from crosstalk channel coefficients of said at least one cancelled disturbing communication line in at least one of a pre-coder and post-coder; and
clearing all of said crosstalk channel coefficients of said at least one cancelled disturbing communication line in said at least one of the pre-coder and post-coder.

11. A crosstalk cancellation method for cancelling crosstalk noise of at most M disturbing communication lines in a victim communication line, said disturbing communication lines and said victim communication line forming part of a vectoring group, and M being a positive integer number, wherein said crosstalk cancellation method comprises:
decreasing a degree of crosstalk cancellation of at least one cancelled disturbing communication line in said victim communication line in response to a crosstalk noise variation in said vectoring group requiring crosstalk noise of a not yet cancelled disturbing communication line in said victim communication line to be cancelled;
reserving K spare positions in a list of the at most M disturbing communication lines, K being an integer number greater than or equal to one, said number K being configurable;
wherein if crosstalk of J not yet cancelled disturbing communication lines has to be cancelled in said victim communication line as a result of the crosstalk noise variation, J representing a positive integer number greater than M−A, with A representing a number of disturbing communication lines whose crosstalk is actually cancelled in said victim communication line, said method further includes adding M−A out of said J not yet cancelled disturbing communication lines to said list of the at most M disturbing communication lines;

increasing K;

iteratively reducing the degree of crosstalk cancellation of K least disturbing communication lines out of said list of the at most M disturbing communication lines in said victim communication line and adding K not yet cancelled disturbing communication lines to said list of the at most M disturbing communication lines until said J not yet cancelled disturbing communication lines have been added to said list of the at most M disturbing communication lines; and resetting K to an initial value.

* * * * *